United States Patent

Sakata et al.

[11] Patent Number: 5,871,705
[45] Date of Patent: Feb. 16, 1999

[54] PROCESS FOR PRODUCING TRICHLOROSILANE

[75] Inventors: Kanji Sakata; Kenji Hirota, both of Tokuyama, Japan

[73] Assignee: Tokuyama Corporation, Yamaguchi-Ken, Japan

[21] Appl. No.: 931,760

[22] Filed: Sep. 16, 1997

[30]     Foreign Application Priority Data

Sep. 19, 1996 [JP] Japan .................................... 8-248169
Sep. 27, 1996 [JP] Japan .................................... 8-256874

[51] Int. Cl.$^6$ ................................................. C01B 33/107
[52] U.S. Cl. ........................................... 423/342; 423/341
[58] Field of Search ..................................... 423/341, 342

[56]              References Cited

U.S. PATENT DOCUMENTS

| | | | |
|---|---|---|---|
| 3,627,501 | 12/1971 | Kruger ..................................... | 423/342 |
| 3,681,036 | 8/1972 | Schwarz et al. ......................... | 423/342 |
| 4,044,109 | 8/1977 | Kotzsch et al. .......................... | 423/342 |
| 4,092,446 | 5/1978 | Padovani et al. ....................... | 423/342 |
| 4,585,643 | 4/1986 | Barker, Jr. ............................... | 423/342 |
| 4,986,971 | 1/1991 | Forwald et al. ......................... | 423/342 |
| 5,063,040 | 11/1991 | Ruff ......................................... | 423/342 |

FOREIGN PATENT DOCUMENTS

| | | | |
|---|---|---|---|
| 1143797 | 6/1960 | Germany ............................... | 423/342 |
| 62-288109 | 12/1987 | Japan ..................................... | 423/342 |
| 63-170210 | 7/1988 | Japan ..................................... | 423/342 |
| 833494 | 6/1981 | U.S.S.R. ................................. | 423/342 |

*Primary Examiner*—Ngoc-Yen Nguyen
*Attorney, Agent, or Firm*—Birch, Stewart, Kolasch & Birch, LLP

[57]                ABSTRACT

A process for producing trichlorosilane by reacting silicon with hydrogen chloride, which comprises bringing at least one silane compound selected from the group consisting of dichlorosilane, monochlorosilane and monosilane into contact with silicon during or prior to a reaction between silicon and hydrogen chloride to remove silicon oxide on the surface of silicon, thereby improving the reactivity of silicon with hydrogen chloride to produce silicon trichloride stably. Further, an alkali metal compound is co-present in the reaction between silicon and hydrogen chloride to suppress the production of silicon tetrachloride, thereby making it possible to produce trichlorosilane at a high selectivity.

14 Claims, No Drawings

PROCESS FOR PRODUCING TRICHLOROSILANE

FIELD OF THE INVENTION

This invention relates to a process for producing silicon trichloride by reacting silicon as a simple substance [hereinafter, "silicon as a simple substance" will be simply referred to as "silicon" in the present specification and claims] with hydrogen chloride. Hereinafter, silicon trichloride and trichlorosilane are used interchangeably.

DESCRIPTION OF THE PRIOR ART

Silicon trichloride is generally produced by catalytically reacting silicon with hydrogen chloride in the presence of a catalytic component. Since silicon produced by metallurgy, which contains a large amount of an iron component having catalytic activity for this reaction, or silicon iron is used as metal silicon which is a reaction material, a reaction between silicon and hydrogen chloride is carried out without adding a catalytic component. Although the reaction product is mainly silicon trichloride, the proportion of silicon tetrachloride by-produced increases as the reaction temperature rises. Therefore, a low reaction temperature is selected from a temperature range at which the reaction between silicon and hydrogen chloride can proceed satisfactorily. Since this reaction is a large exothermic reaction, it is necessary to proceed the reaction stably by increasing the effect of removing the heat of the reaction. Further, to enhance the reaction efficiency of gas-solid contact between powdery solid silicon and a hydrogen chloride gas, a fluidized-bed reactor is generally used.

To produce silicon trichloride or silicon tetrachloride continuously by this reaction, powdery solid silicon as a reaction material is continuously or intermittently fed into a reactor while the reaction residue is removed from the reactor.

However, in the contact reaction between silicon and hydrogen chloride, even when the reactor is filled with silicon and maintained at a predetermined reaction temperature and a hydrogen chloride gas is supplied into the reactor to carry out a contact reaction between silicon and hydrogen chloride, the reaction between hydrogen chloride and silicon hardly proceeds smoothly at the beginning, and hence, silicon trichloride is rarely produced. This is because raw material silicon forms a stable oxide layer on the surface. That is, as the reactivity of the oxide layer with hydrogen chloride is much lower than the reactivity of silicon with hydrogen chloride, silicon having an oxide layer on the surface hardly reacts with hydrogen chloride directly, thereby making it difficult to produce silicon trichloride.

Then, to improve the activity of producing silicon trichloride, such measure is taken that the reaction temperature is elevated to a temperature higher than a predetermined temperature at which silicon exhibits steady reaction activity with hydrogen chloride, and the raw material silicon is brought into contact with hydrogen chloride to remove the oxide layer from the surface of the raw material silicon. In this case, following the above operation, the temperature of the reactor is lowered to a predetermined reaction temperature to obtain steady and stable activity for producing silicon trichloride.

Therefore, when the raw material silicon is to be fed into the reactor continuously or intermittently for the continuous production of silicon trichloride, the reaction temperature must be set to a high temperature at which the oxide layer of silicon is reacted with hydrogen chloride and removed, or the raw material silicon must be reacted with hydrogen chloride at the above high temperature in advance before it is fed into the reactor. However, in the former case, since the reaction temperature is set to a higher temperature, the proportion of silicon tetrachloride by-produced increases and the production rate of silicon trichloride decreases. In the latter case, an additional apparatus for the pre-treatment of the raw material silicon is required to be installed, thereby scaling up the reactor and increasing production costs.

Therefore, there has been desired the development of a process which can improve the activity for producing silicon trichloride in the production of silicon trichloride by reacting silicon with hydrogen chloride and which is capable of producing silicon trichloride stably at a high selectivity even when a reaction is carried out at a low temperature.

SUMMARY OF THE INVENTION

It is an object of the present invention to provide a process for producing silicon trichloride from silicon and hydrogen chloride by improving the reactivity of silicon with hydrogen chloride.

It is another object of the present invention to provide a process for producing silicon trichloride by carrying out a reaction between silicon and hydrogen chloride at a relatively low temperature by improving the reactivity of silicon with hydrogen chloride.

It is still another object of the present invention to provide a process for producing silicon trichloride at a high selectivity by improving the reactivity of silicon with hydrogen chloride and suppressing the production of silicon tetrachloride.

To attain the above objects of the present invention, according to the present invention, there is provided a process for producing silicon trichloride by reacting silicon with hydrogen chloride which comprises bringing at least one silane compound selected from the group consisting of dichlorosilane, monochlorosilane and monosilane into contact with silicon during or prior to a reaction between silicon and hydrogen chloride.

DETAILED DESCRIPTION OF THE PREFERRED EMBODIMENTS

In the silicon trichloride production process of the present invention, methods in which at least one silane compound selected from the group consisting of dichlorosilane, monochlorosilane and monosilane is contacted with silicon are roughly classified into the following two methods:

(A) one in which silicon and hydrogen chloride are reacted with each other in an atmosphere containing the silane compound; and (B) one in which silicon and hydrogen chloride are reacted with each other after the silane compound has been contacted with silicon in advance.

A description is first given of the method (A).

Any known silicon can be used in the present invention without restriction. For example, silicon produced by metallurgy, silicon iron, polycrystalline silicon and the like can be used. The kinds and the amount of impurities contained in the silicon and the particle diameter and the like of silicon differ according to its production process and preservation method.

In the present invention, the average particle size of the silicon is preferred to be small and for example, is in a range of from 20 to 100 $\mu$m, measured in accordance with the Blaine permeability method (JIS R 5201-1964), from the viewpoint of the reactivity of it with hydrogen chloride.

The surface of the raw material silicon is generally covered with silicon oxide. The properties and amount of the silicon oxide differ according to the above production process and preservation method of silicon. The amount of silicon oxide can be calculated, for example, from the peak ratios of silicon oxide to silicon, measured by ESCA (electron spectroscopy for chemical analysis). When silicon is measured by ESCA, the above peak ratio (peak height of silicon oxide/peak height of silicon) is generally in the range of 0.2 to 3. The above value means that 17 to 75% by weight of silicon element on the surface of the silicon exists in a form of an oxide. This silicon oxide must be removed from the surface of the raw material silicon because it impedes a reaction between silicon and hydrogen chloride.

In this invention, the effect is noticeable particularly when silicon containing a large amount of silicon oxide present on the surface is used. For instance, when silicon having a peak ratio (peak height of silicon oxide/peak height of silicon) of 0.8 to 3, obtained by analysis of ESCA, is used, the effect of the invention is especially great.

Any known hydrogen chloride can be used in the present invention without restriction. Hydrogen chloride can be used directly or by diluting it with a gas inactive to reaction. Illustrative examples of the gas inert to reaction include a hydrogen gas, nitrogen gas, helium gas, neon gas, argon gas and the like. The concentration of hydrogen chloride when it is diluted is to be preferably high for carrying out the reaction between silicon and hydrogen chloride effectively. In the method (A), a silane compound to be described later is caused to be present in a gas phase during the reaction between silicon and hydrogen chloride. In this case, the concentration of hydrogen chloride is preferably 20 to 85% by volume based on the volume of a mixture gas of hydrogen chloride and a diluent gas.

The supply rate of hydrogen chloride is associated with the rate of reaction and the space velocity of hydrogen chloride into the reactor is preferably 0.5 to 50 cm/sec., though it depends on the reaction temperature to be set.

The silane compound used in the present invention is at least one member selected from the group consisting of dichlorosilane, monochlorosilane and monosilane. Any known silane compounds can be used as such silane compound without restriction. These silane compounds have high reactivity with silicon oxide on the surface of the raw material silicon. As a result, the silicon oxide layer on the surface of the raw material silicon can be removed quickly and consequently, the reactivity of silicon with hydrogen chloride can be enhanced in the present invention.

These silane compounds can be used directly or by diluting it with a gas inert to reaction. The above diluent gases specified for hydrogen chloride can be used as the gas inert to reaction. The concentration of the silane compound in a gas phase is preferably 1% or more by volume, more preferably 2% or more by volume, to remove the silicon oxide layer on the surface of the raw material silicon. Since further effect can not be gained even though the concentration of the silane compound is increased to more than 20% by volume, the concentration of 20% or less by volume, more preferably 10% or less by volume, is advantageous for the effective use of the silane compound.

Since the silane compound is liable to produce silicon oxide by reacting with water contained in an atmosphere, it can be anticipated that a reduction in the yield of the object silicon trichloride or a reduction in the use effect of the silane compound is caused in the reaction of the present invention which uses the silane compound. Therefore, the silane compound, hydrogen chloride and gases for diluting the silane compound and hydrogen chloride are preferably dried sufficiently and have, for example, a water content of 3,000 ppm or less.

In the present invention, the silane compound may be caused to be present during the entire period of a reaction between silicon and hydrogen chloride or only for a part of the period of the reaction. Stated more specifically, (1) the silane compound may be caused to be present during the entire period of a reaction between silicon and hydrogen chloride;

(2) the silane compound may be caused to be present at least at the beginning of the reaction;

(3) the silane compound may be caused to be present during a period from the beginning of the reaction to the time when the concentration of silicon trichloride in a gas composition at the outlet of the reactor reaches the maximum value in the case where hydrogen chloride is continuously supplied into the reactor and is reacted with silicon; or (4) the silane compound may be caused to be present in a reaction system at least at the time of feeding in the case where the reaction is carried out by feeding silicon into the reactor intermittently during the reaction.

The reaction between silicon and hydrogen chloride is advantageously carried out in the presence of a catalyst. Any catalysts can be used without restriction if they have catalytic activity to produce silicon trichloride from silicon and hydrogen chloride. Preferred examples of the catalyst include elements of group VIII such as iron, cobalt, nickel, vanadium and platinum and compounds of chlorides thereof, metals such as aluminum, copper and titanium, chlorides thereof, and the like.

The amount of the catalyst used is 0.05 to 40% by weight, preferably 0.1 to 5% by weight, based on the amount of silicon in terms of elemental metal contained in the catalyst. The catalyst can be present by adding it to the reaction system. When a catalytic component such as an iron compound is contained as an impurity in the raw material silicon, it can be effectively used as the catalyst. As a matter of course, a catalyst may be further added to the reaction system to enhance the reactivity of silicon with hydrogen chloride even when the raw material silicon containing a catalytic component as an impurity is used.

The reaction temperature is preferably 250° to 500° C., more preferably 250° to 400° C. from the viewpoint of reaction control and the material of the reactor, because the selectivity of producing silicon trichloride tends to decrease as the reaction temperature rises and the reaction is an exothermic reaction.

Since silicon trichloride produced in the present invention has an H—Si bond in the molecule, like the above silane compound, it has higher reactivity with an oxide layer on the surface of the raw material silicon than hydrogen chloride. However, the reactivity is much lower than that of the silane compound. Therefore, in the conventional process for producing silicon trichloride continuously using a fluidized bed reactor, even when an activation treatment is carried out to remove the oxide layer on the surface of the raw material silicon at a high temperature at the beginning of a reaction and then the reaction between silicon and hydrogen chloride is carried out by lowering the reaction temperature, the activity of producing silicon trichloride is reduced right after the raw material silicon is newly fed during the reaction. The reduced activity cannot be recovered fully by silicon trichloride which is present as a product in the reactor. Therefore, the initial steady activity cannot be obtained after the raw material silicon is fed during the reaction in the conventional method. In the present invention, however, when silicon trichloride is continuously produced in the presence of the above specific silane compound, the silane compound is extremely effective in recovering the activity for producing silicon trichloride instantaneously even after the raw material silicon is newly added during the reaction.

When silicon trichloride is to be produced from silicon and hydrogen chloride, dichlorosilane may be sometimes by-produced according to the type of the raw material silicon and the reaction conditions. However, when silicon produced by metallurgy or silicon iron is used as the reaction material, the amount of dichlorosilane by-produced is extremely small and does not impede the effect of the present invention.

In the present invention, any known fixed bed and fluidized bed reactors can be used without restriction as the reactor used for the reaction between silicon and hydrogen chloride. When the reaction between silicon and hydrogen chloride is continued to produce silicon trichloride continuously, solid silicon must be fed into the reactor continuously or intermittently to be brought into contact with a hydrogen chloride gas. In this case, a fluidized bed reactor is preferably used to allow the above catalyst, silicon and hydrogen chloride to contact one another more efficiently. Since the reaction is an exothermic reaction, use of a fluidized bed reactor is further advantageous to improve the effect of removing the heat of the reaction.

The reaction can be also carried out in a tubular reactor filled with silicon while a reaction gas containing a silane compound and hydrogen chloride is supplied into the reactor. In this case, the silane compound and an oxide layer on the surface of silicon react with each other in the stage where the reaction gas passes through the tube. As a result, even by supplying the reaction gas containing 1% or more by volume of the silane compound, the content of the silane compound may become smaller than 1% by volume on the way of the tubular reactor in some case. However, even in this case, as the reaction proceeds, the oxide layer is successively removed from the surface of the raw material silicon charged in an upstream side of the tube and in consequence, the reaction gas containing 1% or more by volume of the silane compound gradually flows into a downstream side of the tube. Therefore, the process of the present invention can be carried out without a problem.

In the process for producing silicon trichloride of the present invention, a description is given of the method (B), that is, the method comprising reacting silicon with hydrogen chloride after a silane compound has been contacted with silicon. In this method, the silane compound can be contacted with silicon in the following manners:

(1) The silane compound is charged into a container filled with silicon and they are contacted with each other in a batch method;
(2) The silane compound is supplied continuously or intermittently into a container filled with silicon and they are contacted with each other in a flow system; and
(3) The silane compound is supplied into a fluidized bed reactor in which silicon particles have been fluidized by a gas which does not react with silicon and the silane compound.

Silicon and silane compounds as described for the method (A) can be used as they are. Although conditions for bringing the silane compound into contact with silicon are not particularly limited, the above-described conditions for the reaction between hydrogen chloride and silicon are preferably employed directly for removing the silicon oxide on the surface of the raw material silicon effectively. That is, the contact temperature is preferably 200° to 500° C., more preferably 250° to 400° C. The contact time varies depending on the amounts of silicon and a silane compound to be charged or supplied and hence, cannot be determined definitely.

The amount corresponding to 5 to 10 times the amount of the silicon oxide present on the surface of the silicon, measured by ESCA, is enough to be the total amount of the silane compound. When such amount of the silane compound is contacted with silicon in a batch method, the contact time from the range of 5 to 30 minutes is generally sufficient.

After the silane compound has been contacted with silicon, the silane compound is removed and hydrogen chloride is supplied to carry out the reaction between silicon and hydrogen chloride. In the case where the silane compound is not removed after it has been contacted with silicon, the reaction between silicon and hydrogen chloride is the same as in the above method (A).

The raw material silicon whose silicon oxide layer on the surface has been removed by contacting to the silane compound easily reacts with hydrogen chloride because of its high chemical reactivity. In addition thereto, however, since it also readily reacts with oxygen contained in the air, the reaction between silicon and hydrogen chloride is hindered. Therefore, after the raw material silicon has been contacted with the silane compound, it is desired that silicon is reacted with hydrogen chloride quickly without being contacted with oxygen. It is generally preferred that the reaction between silicon and hydrogen chloride be continued in a container without removing silicon from the container after silicon has been contacted with the silane compound in the container.

The method (A) described above can be also employed in the reaction between silicon and hydrogen chloride after the silane compound has been contacted with silicon.

When an alkali metal compound is used in addition to the above catalyst at the time of the reaction between silicon and hydrogen chloride in the present invention, by-production of silicon tetrachloride is suppressed and the object silicon trichloride can be obtained at high selectivity.

The alkali metal compound does not have the same catalytic function as the catalyst such as an iron compound in the reaction between silicon and hydrogen chloride, and when it is used alone, it hardly exhibits reactivity by itself. However, when the alkali metal compound is used in combination with the catalyst in the reaction between silicon and hydrogen chloride, it exhibits a secondary catalytic function to suppress a side reaction for producing silicon tetrachloride and produce silicon trichloride at high selectivity. As a result, in the present invention, silicon trichloride can be produced extremely efficiently owing to the above constitution.

In the present invention, the alkali metal compound is a compound of an element selected from elements of group I of the periodic table such as lithium, sodium, potassium, rubidium, cesium and the like. The compounds of these elements may be used as a mixture.

Any form of the alkali metal compound can be used without particular restriction, while it is preferably used in a form of a salt such as chloride, sulfate, nitrate or the like from the viewpoint of easiness in handling. Illustrative examples of the alkali metal compound include lithium chloride, sodium chloride, potassium chloride, cesium chloride, sodium sulfate, potassium sulfate, sodium nitrate, potassium nitrate and the like.

In the present invention, although the amount of the alkali metal compound present in the reaction system is not particularly limited, it is 0.01 to 5% by weight, preferably 0.1 to 3% by weight, in terms of elemental alkali metal, based on the amount of silicon when the high selectivity of producing silicon trichloride is taken into account. Use of an excessive amount of the alkali metal compound is not efficient because a phenomenon that it impedes the reaction between silicon and hydrogen chloride is not seen but the effect of further improving the selectivity of producing silicon trichloride is not recognized.

In the present invention, to add the alkali metal compound to the reaction system, it is generally preferred that the alkali metal compound be mixed with silicon in advance and the resulting mixture be fed into the reaction system. In the case of the continuous production of silicon trichloride or use of a fluidized bed reactor, part of the alkali metal compound or the catalyst is discharged together with a reaction product gas such as silicon trichloride out of the reaction system when the reaction residue of silicon is removed from the reaction system. Therefore, the content of the alkali metal compound or the catalyst contained in the reaction system tends to decrease gradually. Accordingly, when the reaction material silicon is fed into the reaction system, it is preferred that the alkali metal compound or the catalyst be mixed with silicon in advance to appropriately control the amounts of these components in the reaction system within the above ranges.

In the present invention, by reacting silicon with hydrogen chloride in the presence of a silane compound selected from the group consisting of dichlorosilane, monochlorosilane and monosilane, the reactivity of the surface of silicon can be enhanced enabling a reaction between silicon and hydrogen chloride to be carried out at a low reaction temperature. As a result, the selectivity of producing the desired silicon trichloride is improved, thereby making it possible to increase the productivity of silicon trichloride.

Further, the present invention can bring about the effect that silicon trichloride can be produced stably by suppressing a reduction in the conversion at the time when the raw material silicon is fed into the reactor and the subsequent variation in the recovery of the conversion.

Further, according to the present invention, by causing a catalyst such as an iron compound and an alkali metal compound to be co-present in the reaction system in the reaction between silicon and hydrogen chloride, a side reaction for producing silicon tetrachloride which proceeds with an increase in the content of the catalyst in the reaction system and the accumulation of reaction heat can be suppressed without impeding the reaction between silicon and hydrogen chloride and the selectivity of producing silicon trichloride (production rate) can be enhanced.

Further, according to the present invention, since it is not necessary to adjust the concentration of the catalyst such as iron in the reaction system within a specific range precisely for the purpose of suppressing the production of silicon tetrachloride and the allowable control range of the reaction temperature is widened due to the suppression of the production of silicon tetrachloride, it is possible to produce silicon trichloride stably.

EXAMPLE 1

After 1 g of silicon was charged into a quartz glass tube reactor having an inner diameter of 4 mm and the reactor was maintained at 350° C., a mixture gas of 20 ml/min of a hydrogen chloride gas, 20 ml/min of a nitrogen gas and 1.0 ml/min of a dichlorosilane gas was supplied into the reactor continuously. A gas composition at the outlet of the reactor was analyzed by a gas chromatography, and the conversion of reaction (%) was calculated from a reduction in the amount of the hydrogen chloride gas, and a ratio of silicon trichloride to the total amount of silicon trichloride and silicon tetrachloride produced was calculated as the selectivity to silicon trichloride (%). In the calculation of the selectivity to silicon trichloride, the amount of silicon trichloride produced was corrected from a reduction in the amount of dichlorosilane at the outlet of the reactor because part of dichlorosilane supplied was converted into silicon trichloride. At the point when the production of silicon trichloride and silicon tetrachloride was not observed any longer, the supply of a reaction gas such as hydrogen chloride and the like was stopped, the temperature was lowered, the reaction residue was taken out from the reactor and measured for its weight, and the conversion (%) of silicon was calculated from the amount of silicon charged into the reactor.

As a result, 10 minutes after the start of supplying a mixture gas of hydrogen chloride, dichlorosilane and nitrogen into the reactor, the gas composition containing silicon trichloride and the like at the outlet of the reactor reached an almost steady state. At this point, the conversion of reaction was 100%, the selectivity to silicon trichloride was 87%, and the conversion of silicon was 94%. During the reaction, the content of dichlorosilane at the outlet of the reactor was always not less than 2% by volume of the gas composition at the outlet.

The silicon used in this example contained 0.3% by weight of metal iron, and the peak ratio of silicon oxide on the surface to silicon, measured by ESCA, was 2.0. This value means that 67% of elements on the surface of the silicon were converted into oxides. The average particle diameter of the silicon, measured by the Blaine permeability method was 54 $\mu$m.

Comparative Example 1

The procedure of Example 1 was repeated except that dichlorosilane was not added to the reaction gas to be supplied into the reactor filled with silicon and a mixture gas of 20 ml/min of a hydrogen chloride gas and 20 ml/min of a nitrogen gas was used. In a contact reaction between silicon and hydrogen chloride, the production of silicon trichloride and silicon tetrachloride was not observed at all at a reaction temperature of 350° C. within 30 minutes from the start of supplying a mixture gas of a hydrogen chloride gas and a nitrogen gas into the reactor.

Thereafter, while the mixture gas of a hydrogen chloride gas and a nitrogen gas was supplied into the reactor filled with silicon, the reaction temperature was elevated stepwise from 360° C. by 10° C. at a time and the reactor was maintained at each temperature for 30 minutes while the gas composition at the outlet of the reactor was analyzed. As a result, the production of silicon trichloride and the like was observed at 380° C., the conversion of reaction was 100%, the selectivity to silicon trichloride was 75%, the conversion of silicon was 79%. The content of dichlorosilane at the outlet of the reactor during the reaction was 0.05% by volume of the gas composition at the outlet.

EXAMPLE 2

After silicon was charged into the reactor and the reactor was maintained at 350° C., a contact reaction was carried out in the same manner as in Example 1 except that a mixture gas of 1.0 ml/min of a dichlorosilane gas and 20 ml/min of a nitrogen gas was supplied into the reactor continuously and after 10 minutes, a mixture gas of 20 ml/min of a hydrogen chloride gas and 20 ml/min of a nitrogen gas and containing no dichlorosilane was supplied in place of the above mixture gas. In the contact reaction between silicon and hydrogen chloride, the gas composition comprising silicon trichloride and the like at the outlet of the reactor reached an almost steady state 5 minutes after the start of supplying the mixture gas of hydrogen chloride and nitrogen into the reactor. The conversion of reaction was 100%, the selectivity to silicon trichloride was 87%, and the conversion of silicon was 95%. The content of dichlorosilane at the outlet of the reactor was 0.05% by volume of the gas composition at the outlet.

EXAMPLE 3

A mixture gas of hydrogen chloride, nitrogen and dichlorosilane was supplied into the reactor to carry out a contact reaction between silicon and hydrogen chloride in the same manner as in Example 1 except that the silicon charged into the reactor was replaced by silicon having a peak ratio (peak height of silicon oxide)/(peak height of silicon), measured by ESCA, of 0.5 (this means that 33% of silicon elements on the surface is oxides), containing 0.15% by weight of metal iron and having an average particle diameter of 38 $\mu$m.

Five minutes after the start of supplying the mixture gas of hydrogen chloride, nitrogen and dichlorosilane into the reactor, the gas composition comprising silicon trichloride and the like at the outlet of the reactor reached an almost steady state. The conversion of reaction was 100%, the selectivity to silicon trichloride was 86%, and the conversion of silicon was 95%. During the reaction, the content of dichlorosilane at the outlet of the reactor was not less than 2% by volume of the gas composition at the outlet.

Comparative Example 2

The procedure of Example 3 was repeated except that dichlorosilane was not added to the reaction gas to be supplied into the reactor filled with silicon and a mixture gas of 20 ml/min of a hydrogen chloride gas and 20 ml/min of a nitrogen gas was used. In the contact reaction between silicon and hydrogen chloride, 5 minutes after the start of supplying the mixture gas of a hydrogen chloride gas and a nitrogen gas into the reactor, the production of silicon trichloride and silicon tetrachloride was gradually observed at a reaction temperature of 350° C. The gas composition comprising silicon trichloride and the like at the outlet of the reactor reached an almost steady state after 30 minutes. The conversion of reaction was 100%, the selectivity to silicon trichloride was 86%, and the conversion of silicon was 95%. During the reaction, the content of dichlorosilane at the outlet of the reactor was 0.05% by volume of the gas composition at the outlet.

EXAMPLE 4

250 Grams of silicon used in Example 1 was charged into a stainless steel fluidized bed reactor having an inner diameter of 50 mm and a height of 1,000 mm and the temperature of the reactor was elevated to 350° C. while a mixture gas of 2,500 ml/min of a hydrogen chloride gas, 2,500 ml/min of a nitrogen gas and 125 ml/min of a dichlorosilane gas was supplied into the reactor continuously. When the temperature of the reactor reached 350° C., the conversion of reaction was 100% and the selectivity to silicon trichloride was 88%.

After it was confirmed that the conversion of reaction and the selectivity to silicon trichloride became 100% and 88%, respectively, 1 hour after the temperature of the reactor reached 350° C. and that the reaction reached a steady state, silicon was fed into the reactor continuously at a rate of 60 g/hr. The conversion of reaction and the selectivity to silicon trichloride were 100% and 88%, respectively, 5 hours after the start of supplying silicon continuously.

Comparative Example 3

The procedure of Example 4 was repeated except that dichlorosilane was not added to the reaction gas to be supplied into the reactor filled with silicon and a mixture gas of 2,500 ml/min of a hydrogen chloride gas and 2,500 ml/min of a nitrogen gas was used, and the temperature of the reactor was elevated to 350° C. as in Example 4. Since the production of silicon trichloride was hardly observed even 1 hour after the temperature of the reactor reached 350° C., the temperature of the reactor was elevated to 380° C. while the mixture gas of a hydrogen chloride gas and a nitrogen gas was supplied into the reactor.

At a reactor temperature of 380° C., the conversion of reaction after 1 hour was 100% and the selectivity to silicon trichloride was 76%, and then, the temperature of the reactor was lowered to 350° C. At a reactor temperature decreased to 350° C., the conversion of reaction was 100% and the selectivity to silicon trichloride was 87%.

Then, silicon was supplied into the reactor continuously at a rate of 60 g/hr as in Example 4. At a reactor temperature of 350° C., the amounts of silicon trichloride and silicon tetrachloride produced decreased 3 hours after the start of supplying silicon continuously, and the production of silicon trichloride and silicon tetrachloride was hardly observed after 5 hours.

EXAMPLE 5

The procedure of Example 4 was repeated except that 125 ml/min of a monosilane gas was added to the reaction gas to be supplied into the fluidized bed reactor in place of dichlorosilane. Five hours after the start of supplying silicon continuously, the conversion of reaction was 100%, the selectivity to silicon trichloride was 86%, and the conversion of silicon was 95%. During the reaction, the content of monosilane at the outlet of the reactor was not less than 2% by volume of the gas composition at the outlet.

EXAMPLE 6

The procedure of Example 4 was repeated except that 125 ml/min of a monochlorosilane gas was added to the reaction gas to be supplied into the fluidized bed reactor in place of dichlorosilane. Five hours after the start of supplying silicon continuously, the conversion of reaction was 100%, the selectivity to silicon trichloride was 85%, and the conversion of silicon was 95%. During the reaction, the content of monochlorosilane at the outlet of the reactor was not less than 2% by volume of the gas composition at the outlet.

EXAMPLE 7

A mixture gas of 2,500 ml/min of a hydrogen chloride gas, 2,500 ml/min of a nitrogen gas and 125 ml/min of a dichlorosilane gas was supplied into the reactor continuously as in Example 4 except that the reaction temperature was set to 330° C. Five hours after the start of supplying silicon continuously, the conversion of reaction was 100%, the selectivity to silicon trichloride was 89%, and the conversion of silicon was 92%. During the reaction, the content of dichlorosilane at the outlet of the reactor was not less than 2% by volume of the gas composition at the outlet.

EXAMPLE 8

The procedure of Example 4 was repeated except that the amount of dichlorosilane to be added to the reaction gas to be supplied into the reactor was changed as follows.

When 62.5 ml/min of dichlorosilane was mixed with 2,500 ml/min of a hydrogen chloride gas and 2,500 ml/min of a nitrogen gas, the conversion of reaction was 100%, the selectivity to silicon trichloride was 86%, and the conversion of silicon was 91%. The content of dichlorosilane at the outlet of the reactor during the reaction was always not less than 1% by volume of the gas composition at the outlet.

When 500 ml/min of dichlorosilane was mixed with 2,500 ml/min of a hydrogen chloride gas and 2,500 ml/min of a nitrogen gas, the conversion of reaction was 100%, the selectivity to silicon trichloride was 87%, and the conversion of silicon was 96%.

EXAMPLE 9

The reactor was maintained at 350° C. and then a mixture gas of 20 ml/min of a hydrogen chloride gas, 20 ml/min of a nitrogen gas and 1.0 ml/min of dichlorosilane gas was supplied into the reactor continuously as in Example 1 except that 1 g of silicon and 25 mg (equivalent to about 1% by weight of silicon in terms of element) of sodium chloride as an alkali metal compound were mixed and charged into a quartz glass tube reactor. The reaction reached an almost steady state 10 minutes after the start of supplying the mixture gas of hydrogen chloride and nitrogen into the reactor. The conversion of reaction was 100% and the selectivity to silicon trichloride was 94%. The content of monosilane at the outlet of the reactor during the reaction was always not less than 2% by volume of the gas composition at the outlet.

EXAMPLES 10 TO 19

A contact reaction between silicon and hydrogen chloride was carried out in the same manner as in Example 9 except that 225 mg (equivalent to 10% by weight of silicon in terms of element) of ferrous chloride was added to silicon and an alkali metal compound shown in Table 1 was added to silicon in an amount shown in Table 1 in terms of element. The reaction reached an almost steady state 10 minutes after the start of supplying the mixture gas of hydrogen chloride and nitrogen into the reactor. The results are shown in Table 1. Since the conversion of reaction of hydrogen chloride was almost 100%, only the selectivity to silicon trichloride is shown in Table 1. The amount of dichlorosilane at the outlet of the reactor during the reaction was always not less than 2% by volume of the gas composition at the outlet. Further, the reaction was carried out in the same manner as described above except that an alkali metal compound was not added and the result is shown as Example 19 in Table 1.

EXAMPLES 20 TO 27

A contact reaction between silicon and hydrogen chloride was carried out by adding an alkali metal compound shown in Table 2 to silicon in an amount shown in Table 2 in terms of element in the same manner as in Example 9 except that the reaction temperature was elevated to 400° C. The reaction reached an almost steady state 10 minutes after the start of supplying the mixture gas of hydrogen chloride and nitrogen into the reactor. The results are shown in Table 2. Since the conversion of reaction of hydrogen chloride was almost 100%, only the selectivity to silicon trichloride is shown in Table 2. The content of dichlorosilane at the outlet of the reactor during the reaction was always not less than 2% by volume of the gas composition at the outlet.

Further, the reaction was carried out at 400° C. in the same manner as described above except that an alkali metal compound was not added and the result is shown as Example 27 in Table 2.

EXAMPLE 28

A contact reaction between silicon and hydrogen chloride was carried out in the same manner as in Example 9 except that high-purity silicon having a purity of not lower than 99.999% and an average particle diameter of 86 μm was used in place of the silicon (content of metal iron was 0.15% by weight) and a nickel metal powder as a catalytic component and sodium chloride as an alkali metal compound were added to silicon in an amount of 0.2% by weight in terms of element. As a result, the conversion of reaction was 100% and the selectivity to silicon trichloride was 82%.

The reaction reached an almost steady state 10 minutes after the start of supplying the mixture gas of hydrogen chloride and nitrogen into the reactor. The content of dichlorosilane at the outlet of the reactor during the reaction was always not less than 2% by volume of the gas composition at the outlet.

EXAMPLE 29

A reaction was carried out in the same manner as in Example 28 except that no alkali metal compound was added. As a result, the conversion of reaction was 100% and the selectivity to silicon trichloride was 70%.

TABLE 1

|  | alkali metal compound (wt %) | Selectivity to silicon trichloride (%) |
|---|---|---|
| Example 10 | NaCl (0.1) | 90 |
| Example 11 | NaCl (0.5) | 91 |
| Example 12 | NaCl (5) | 92 |
| Example 13 | LiCl (1) | 90 |
| Example 14 | KCl (1) | 92 |
| Example 15 | KCl (5) | 92 |
| Example 16 | CsCl (1) | 90 |
| Example 17 | RbCl (1) | 88 |
| Example 18 | $Na_2SO_4$ (1) | 91 |
| Example 19 | — | 80 |

TABLE 2

|  | alkali metal compound (wt %) | selectivity to silicon trichloride (%) |
|---|---|---|
| Example 20 | NaCl (0.1) | 86 |
| Example 21 | NaCl (1) | 92 |
| Example 22 | NaCl (5) | 93 |
| Example 23 | LiCl (1) | 89 |
| Example 24 | KCl (1) | 92 |
| Example 25 | CsCl (1) | 90 |
| Example 26 | $Na_2SO_4$ (1) | 91 |
| Example 27 | — | 72 |

What is claimed is:

1. A process for producing trichlorosilane by reacting silicon with hydrogen chloride, the process comprising bringing at least one silane compound selected from the group consisting of dichlorosilane, monochlorosilane and monosilane into contact with silicon during or prior to a reaction between silicon and hydrogen chloride, wherein the reaction between silicon and hydrogen chloride is carried out in the co-presence of a catalyst having a catalytic activity for producing trichlorosilane from silicon and hydrogen chloride and an alkali metal compound.

2. The process of claim 1, wherein silicon and hydrogen chloride are reacted with each other in an atmosphere containing 1 to 20% by volume of the silane compound based on the total volume of the gaseous reactants used.

3. The process of claim 1, wherein the silane compound is caused to be present during the entire period of the reaction between silicon and hydrogen chloride.

4. The process of claim 1, wherein the silane compound is caused to be present at least at the beginning of the reaction between silicon and hydrogen chloride.

5. The process of claim 1, wherein the reaction between silicon and hydrogen chloride is carried out by supplying hydrogen chloride into a reactor continuously and the silane compound is caused to be present in a reaction system during a period from the beginning of the reaction to a time when the concentration of trichlorosilane in a gas composition at the outlet of the reactor reaches the maximum value.

6. The process of claim 1, wherein the reaction between silicon and hydrogen chloride is carried out by feeding silicon into a reactor intermittently during the reaction and the silane compound is caused to be present in a reaction system at least at the time of feeding.

7. The process of claim 1, wherein the catalyst having a catalytic activity for producing trichlorosilane from silicon and hydrogen chloride is an element of group VIII of the periodic table or a compound thereof.

8. The process of claim 7, wherein the element of group VIII of the periodic table or compound thereof is iron, nickel, cobalt, palladium, platinum or a chloride thereof.

9. The process of claim 1, wherein the alkali metal compound is an alkali metal chloride, alkali metal sulfate or alkali metal nitrate.

10. The process of claim 1, wherein the alkali metal compound is lithium chloride, sodium chloride, potassium chloride, cesium chloride, rubidium chloride, sodium sulfate or sodium nitrate.

11. The process of claim 7, wherein the catalyst having a catalytic activity for producing trichlorosilane from silicon and hydrogen chloride is present in an amount of 0.05 to 40% by weight in terms of element of group VIII, based on the amount of silicon.

12. The process of claim 1, wherein the alkali metal compound is caused to be present in an amount of 0.01 to 5% by weight in terms of alkali metal, based on the amount of silicon.

13. The process of claim 1, wherein the alkali metal compound is a compound of an element selected from the group consisting of lithium, sodium, potassium, rubidium and cesium.

14. The process of claim 12, wherein the amount of alkali metal compound present is 0.1 to 3% by weight.

* * * * *